INVENTOR.
HARRY GROSSMAN
BY Fishman and Vankirk
ATTORNEYS

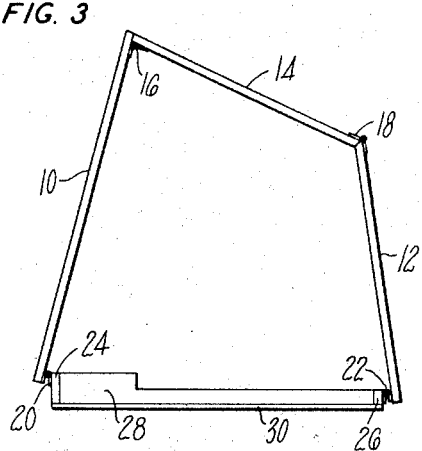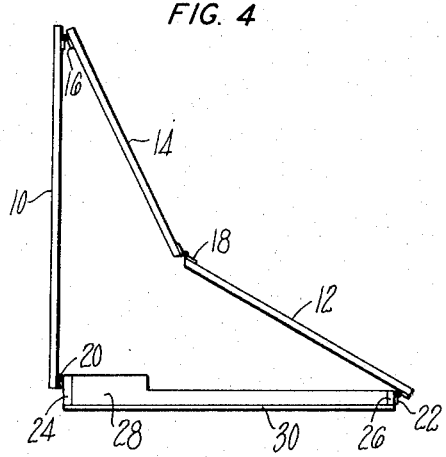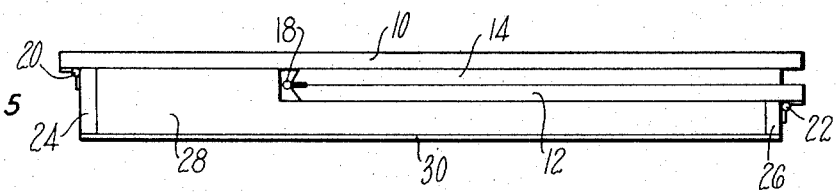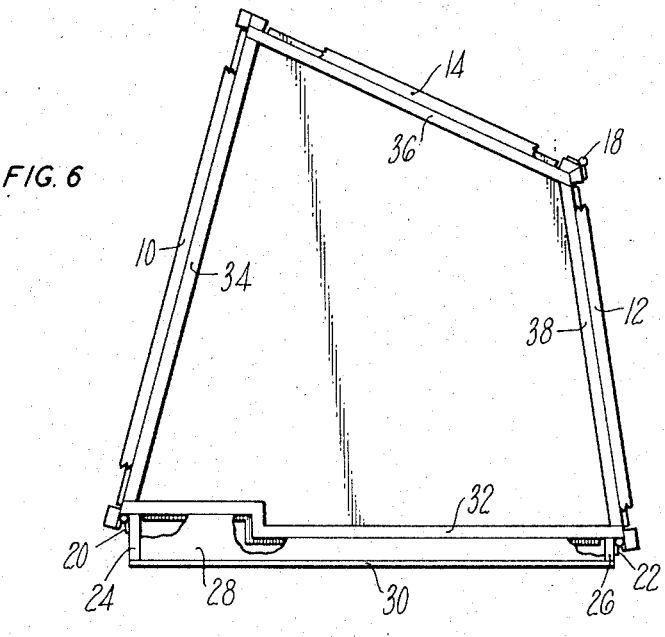

United States Patent Office 3,454,020
Patented July 8, 1969

3,454,020
CAMPER UNIT
Harry Grossman, 211 Elmfield St.,
West Hartford, Conn. 06110
Filed Oct. 30, 1967, Ser. No. 679,007
Int. Cl. A45f 1/00
U.S. Cl. 135—1                                    9 Claims

ABSTRACT OF THE DISCLOSURE

A foldable camper unit adapted for use either on the ground or on top of a vehicle. The unit is characterized by a pair of side panels which are attached by hinges to opposite sides of both a base and a roof panel, the side and roof panels being of such dimension so as to enable the unit to be folded flat when not in use, folding being permitted by making the top panel narrower than the base. The unit also has hingably mounted end panels which butt against a rim to provide for structural integrity in the "in use" position.

BACKGROUND OF THE INVENTION

Field of the invention

The present invention relates to camper units. More particularly, the present invention is directed to foldable living units which may be transported on the top of a vehicle with minimum wind resistance and which, when in the erected position, provide maximum useable space. Accordingly, the general objects of the present invention are to provide new and improved apparatus of such character.

Description of the prior art

As is well known by camping enthusiasts, present living units of the type which may be transported on or in a vehicle to a camp site and there assembled or erected for use are compromises between various desirable attributes. For the most part, the desirable attributes of minimum size package for transporting purposes with maximum useable enclosure area when erected has been offered only by the tent. However, tents have the obvious disadvantages that erection is usually time consuming, erected tents inherently lack rigidity or structural integrity and also lack a solid base or floor member and tents require a camp site of suitable terrain. In addition, the tent must be used on the ground. It is not unusual for a late arrival at a camp site to be unable to find a site having the necessary characteristics for pitching a tent.

The alternative to use of a tent is the employment of a trailer type device. The expense of these devices and the problem associated with towing trailers are well known and will not be discussed herein.

A number of erictable camper units which may be used on top of a vehicle have been proposed. None of these devices has won acceptance because of inherent limitations therein. Firstly, the devices typically have high resistance to wind in the stowed position. Secondly, none of the prior art car top devices had sufficient flexibility so that they could be used either on the vehicle roof or the ground. Thirdly, because of their construction, previous car top devices have been expensive to produce, difficult to use and have had other deficiencies such as lack of structural rigidity.

SUMMARY OF THE INVENTION

The present invention overcomes the above mentioned deficiencies of prior art and in so doing provides a camper unit which may be employed either on the top of a vehicle or on the ground. The unit of the present invention consists of a floor member or base having a pair of oppositely disposed side panels attached thereto by means of hinges. The side panels, which in the erected position are angled toward one another, are joined by a roof panel which is smaller than the base end and which is affixed to the side panels by means of hinges. The interconnection arrangement coupled with the size and shape of the side and roof panels enables the unit to be folded into a compact, flat unit when not in use. When erected, a pair of end panels, which may be attached to one of the side panels by means of hinges, may be moved into position and will prevent unintentional folding of the unit and enhance the structural rigidity of the unit. A curtain member is provided around one of the side panels and functions as a weather seal when the unit is erected and as the top of the transporting enclosure when the unit is folded.

BRIEF DESCRIPTION OF THE DRAWING

The present invention may be better understood and numerous other features and advantages thereof will become apparent to those skilled in the art by reference to the accompanying drawing wherein like reference numerals refer to like elements in the various figures and in which:

FIGURE 3 is a schematic view of the embodiment of FIGURE 1 in the erected position.

FIGURE 4 is a schematic view similar to FIGURE 3 with the unit in the partly folded position.

FIGURE 5 is a schematic view similar to FIGURE 4 with the unit in the fully folded position.

FIGURE 6 is an end view of the preferred embodiment of the present invention with the end panel in place.

DESCRIPTION OF THE PREFERRED EMBODIMENT

Figure 1:
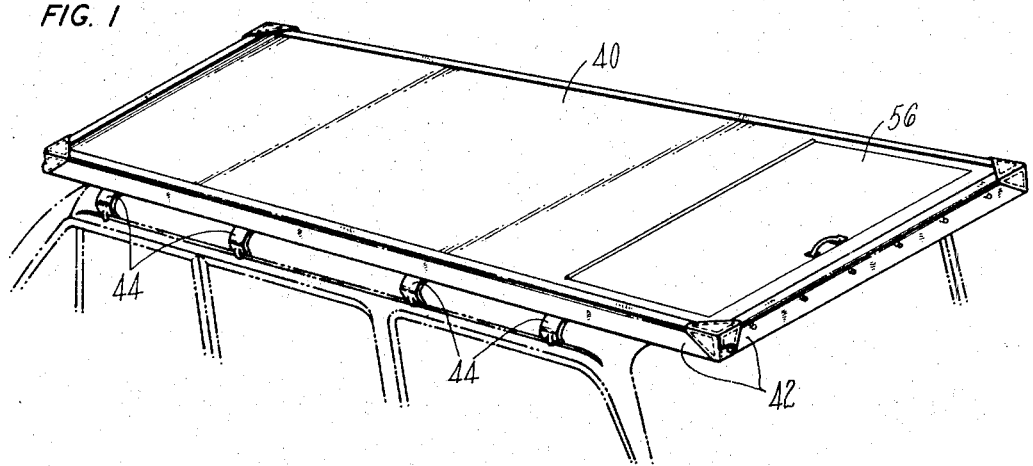
FIGURE 1 is a perspective view of a preferred embodiment of the present invention as transported on top of a vehicle.

The preferred embodiment of the present invention may be most clearly understood from the simultaneous consideration of FIGURES 3, 4 and 5. The camper unit depicted in these figures consists of a pair of oppositely disposed side panel frames 10 and 12 which, when in the erected position shown in FIGURE 3, are bridged by a top panel frame 14. Top panel frame 14 is attached to the larger of the side panels, frame 10, by means of an internal hinge 16. The top panel frame 14 and the smaller of the side panels, frame 12, are joined by an external hinge 18. Hinges 16 and 18 may comprise a plurality of separate, small hinges or they may comprise piano type hinges which run the length of the junction point between the panels. The panel frames 10, 12 and 14 are rectangular in shape thereby defining the overall dimension of the panels. If desired or necessary, a plurality of intermediate rib members may be employed on each panel. The panel frames may be comprised of wood, metal or plastic in tubular form and the frames may be covered with marine plywood, treated fabric tent material, plastic or a light weight sheet metal such as aluminum as desired.

The frames 10, 12 of the oppositely disposed side panels are also attached, respectively by means of hinges 20 and 22, to a frame or rim which extends about the periphery of the base of the unit. The side pieces 24, 26 which comprise the rim about the base can most clearly be seen from FIGURE 6 which is an end view, partly in section, of the unit in the erected position shown schematically in FIGURE 3. As may be seen from FIGURE 6, hinges 20 attach the frame 10 of the larger of the side panels to rim member 24 while hinges 22 connect the frame 12 of the other side panel to rim member 26. The rim is completed by a pair of step-shaped end members, one of which 28 is shown in FIGURES 3–6. The base itself is indicated at 30 and is preferably comprised of a sheet of suitably treated wood. However, a fabric or metallic panel could be employed.

The camper unit of the present invention also comprises a pair of oppositely disposed end panels. One of these end panels may be seen in position in FIGURE 6. Like the side and top panels, the end panels comprise frames which are covered by a suitable material. In FIGURE 6, the members which comprise the frame of a first end panel, are indicated at 32, 34, 36 and 38. In a preferred embodiment, end panel frame member 34 is affixed to frame 10 of the larger side panel by means of hinges so that the end members may be folded inwardly and stored against the larger side panel when the unit is not in use. Alternatively, the end panels may be stored in the bottom of the unit and merely lifted into place. It should be noted that lower end panel frame member 32 is of the same shape as base rim members 28, the end panel frame member 32 also having a step configuration. When in place, as shown in FIGURE 6, the end panels impart structural rigidity to the unit and prevent accidental folding thereof.

It is, of course, necessary to insure that there will be no leakage of water from the exterior to the interior of the unit in both the folded and erected positions. In addition, it is desirable to provide a package of as streamlined a design as possible to facilitate transportation of the folded unit. To this end, the skin 40 which covers the frame 10 of the larger side panel, which is the panel which forms the top of the unit in the folded position, is provided with a lip 42 which extends downwardly at approximately a 90° angle to the panel on three sides and thus partly covers the end panels and top panel. Lip 42 may be most clearly seen from a consideration of FIGURE 7 and is also indicated on FIGURE 1. As may best be seen from FIGURE 3, leakage about the junction of the top and smaller of the side panels is prevented by the shaping of the longitudinal members of frames 14 and 12 so that they abut against one another tightly.

The camper unit of the present invention is shown in the folded position in FIGURES 1 and 5. As may clearly be seen from FIGURE 5, when folded the larger of the side panels comprises the top of the compact, flat package which results. The thickest portion of base frame end members 28 determines the degree of folding or height of the package and this step, as well as the entire base frame member is designed so as to provide space for storage inside the unit when it is folded. As may also be seen from FIGURE 5, in the stowed or folded position the top panel and the smaller of the side panels are folded over on top of one another. The combined folded height of top and side panel frames 12 and 14 corresponds to the height of the step in rim members 28 and, as may be seen from FIGURE 5, the width of the smaller side and top panels is equal to the length of the narrower portion of rim members 28. Thus, with the unit folded as shown in FIGURE 5, a rim of constant height is formed around the periphery of base 30.

Figure 2:
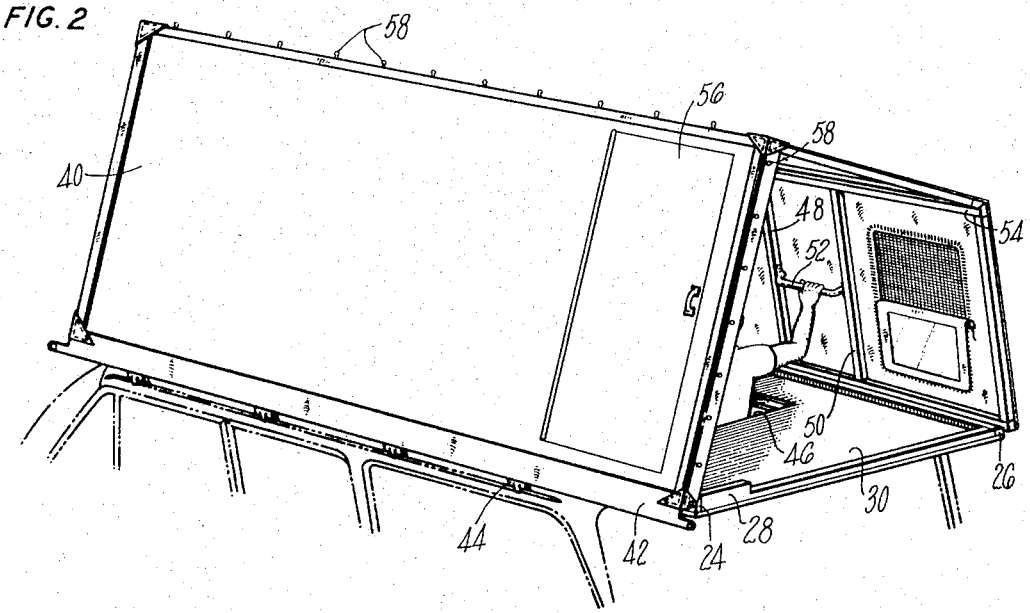
FIGURE 2 is a perspective view of the embodiment of FIGURE 1 during the erection operation on top of the vehicle.

As noted above, the stowed or folded position is shown in FIGURES 1 and 5. With the unit folded it will be attached to the top of a vehicle by conventional means such as clamps 44 (FIGURE 1) which are removably attached to the base 30. If the unit is to be used on top of the vehicle, the vehicle will either have or be modified to have a roof panel which opens. Access to the camper unit is then possible through the vehicle roof opening and an opening 46 (see FIGURE 2) in base 30 of the camper unit which is in registration therewith. Once access is had to the interior of the folded camper unit, the unit may be erected merely by urging the smaller of the side panels upwardly and outwardly. FIGURE 4 shows the frame members in an intermediate stage of erection while FIGURES 2 and 3 show the unit as completely erected but without the side panels in place. In order to prevent damage to the unit during erection, the smaller side panel will typically be enforced at the point where lifting pressure is to be applied. Such reinforcement is shown in FIGURE 2 as provided by a pair of parallel, vertically oriented ribs 48 and 50 which have a handle member 52 extending therebetween. Depending on the size of the unit, it may also be necessary to provide for a telescoping, elongated handle member which is pivotally attached to the upper cross member 54 of side panel frame 12 to thereby enable pressure to be applied adjacent the junction of the side and top panels from a distant point. Lifting pressure could also be applied to frame 12 by pivoting reinforcing ribs 48 and 50 about the side panel upper frame member 54 so that the reinforcing ribs may be used as push rods.

Once the two hinged sides and the hinged top member are caused to assume the fully erected position shown in FIGURES 2 and 3, the end panels are either rotated or otherwise inserted in position in the frame defined by rim members 28 and the side members of the top side panel frames. This produces a "corking" effect and results in the structure shown in FIGURES 6 and 7.

Figure 7:
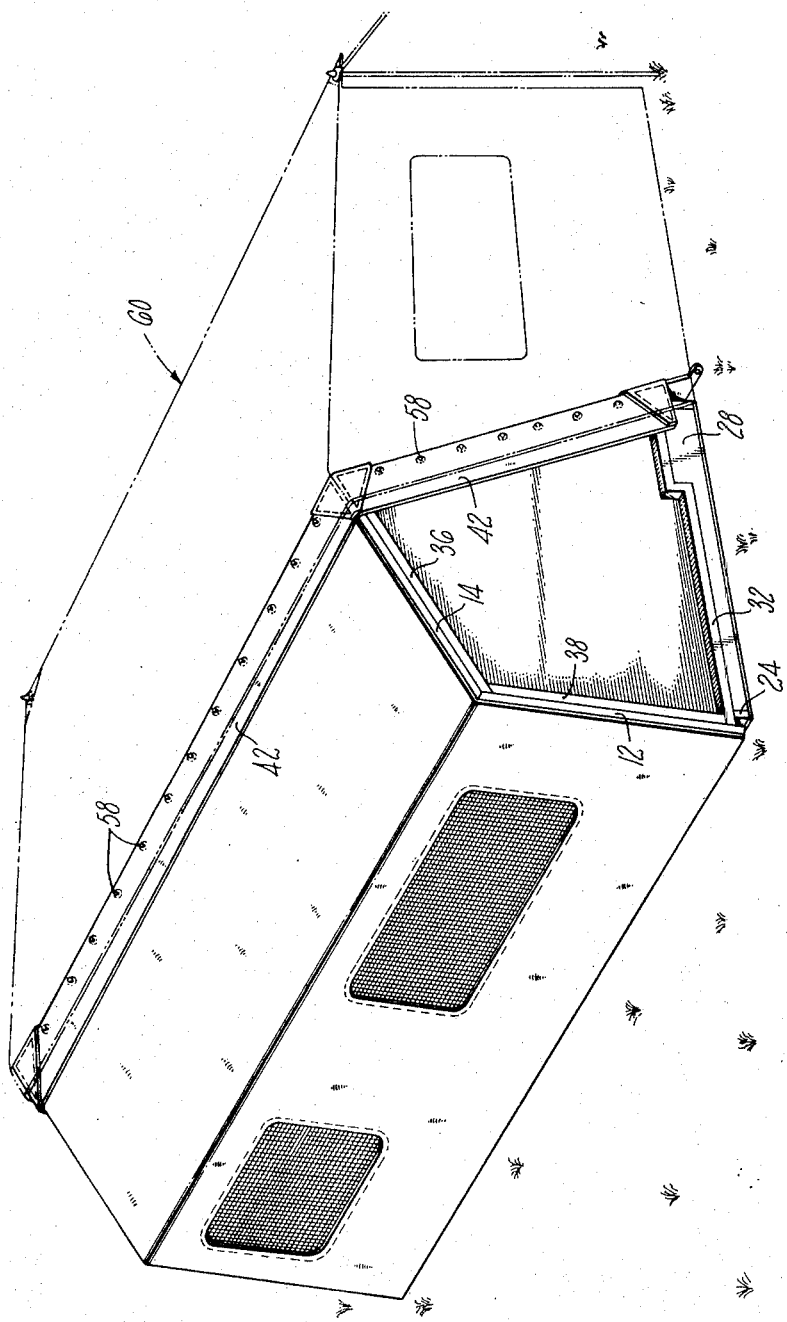
FIGURE 7 is a perspective view of the preferred embodiment of the present invention used on the ground with an auxiliary tent extending therefrom.

It should also be noted that the skin 40 of the larger of the side panels is provided with a door 56 which may be opened outwardly. If the side panels, or at least the larger side panel, is comprised of wood or metal, door 56 will be mounted by hinges, not shown. If the skin of the panel member is comprised of fabric, door 56 may be opened by means of a zipper which extends around three sides thereof. The provision of door 56 enables access to the interior of the camper in either the erected or stowed positions. In the stowed position, the access door facilitates the storing of additional equipment inside the unit. In the erected position, door 56 permits the unit to be used on top of a vehicle which is not of the sun roof type or permits access to the unit when used on the ground as shown in FIGURE 7. It should also be noted that a plurality of snaps or other attachment means 58 are provided about the periphery of side panel frame 10. As shown in FIGURE 7, an awning type tent 60 may be attached to the camper unit comprising the present invention by means of attachment means 58 thereby increasing the useable living area.

As will now be obvious, the camper unit of the present invention is a highly flexible unit which may be used either on top of a vehicle or on the ground. Regardless of where it is used, the present invention provides a weather-proof shelter which is easy to erect, is characterized by a relatively high degree of security, may have a solid floor member, has increased structural rigidity in the erected position when compared to prior art devices of like character and which may be folded into a compact package having minimum wind resistance for transportation. The resultant compact package coupled with the maximum useable space when erected is a direct product of the formation of the unit from four panels which are interconnected by means of hinges with the top panel being of smaller size than the base and with one side panel being larger than the top panel and at least of the same size as the base.

While a preferred embodiment has been shown and described, various modifications and substitutions may be made without departing from the spirit and scope of the present invention. Accordingly, the present invention has been described by way of illustration and not limitation.

What is claimed is:

1. A camper unit comprising:

base means;

a first side;

first hinge means for joining said first side to said base means along a first edge of said base means;

a second side having the same length but less width than said first side;

second image means for joining said second side to said base means along a second edge of said base means, said second edge and side being disposed opposite to said first edge and side;

a top member, said top member having the same length but less width than said first side;

third hinge means for joining said top member to said first side, said third hinge means permitting said top member to be folded against the inwardly disposed surface of said first side; and fourth hinge means for joining said top member to said second side, said fourth hinge means permitting said top member to be folded against the outwardly disposed surface of said second side whereby said top member will bridge said first and second sides in the erected position of said unit and will be sandwiched between said first and second sides in the stowed position of said unit; and first and second end means commensurate in size and shape with the opening defined by said base means, top member and first and second sides when said camper unit is in the erected position, said end means being positioned in said unit after erection thereof and each comprising a rigid outer frame and a covering for said frame.

2. The camper unit of claim 1 wherein said base comprises:
   an outer frame;
   a floor panel; and
   means in said floor panel for permitting access to said unit from the underside of said base means.

3. The camper unit of claim 1 wherein said first side comprises:
   an outer frame;
   a covering for said frame; and
   means providing access to the interior of said unit through said covering.

4. The camper unit of claim 1 wherein said first side comprises:
   an outer frame; and
   a covering for said frame, said covering bridging said frame and extending downwardly about the periphery thereof to provide a weather seal over said third hinge means when the unit is erected and a cover around the unit when in the stowed position.

5. The camper unit of claim 4 wherein said base comprises:
   an outer frame; and
   a floor panel.

6. The camper unit of claim 5 wherein said base further comprises:
   means in said floor panel for permitting access to said unit from the underside of said base.

7. The camper unit of claim 4 wherein said first side further comprises:
   means providing access to the interior of said unit through the covering of said first side.

8. The camper unit of claim 7 wherein said base comprises:
   an outer frame;
   a floor panel; and
   means in said floor panel for permitting access to said unit from the underside of said base.

9. The camper unit of claim 8 further comprising:
   means disposed about the periphery of said first side for attaching a tent-like extension to said unit.

References Cited

UNITED STATES PATENTS

| | | |
|---|---|---|
| 3,001,813 | 9/1961 | Johnson. |
| 3,021,852 | 2/1962 | Hoffman. |
| 3,120,076 | 2/1964 | Zuch _____ 52—70 X |

KENNETH DOWNEY, *Primary Examiner.*

U.S. Cl. X.R.

22—70; 296—23